United States Patent
Gupta et al.

(10) Patent No.: US 9,246,913 B2
(45) Date of Patent: Jan. 26, 2016

(54) SHARING CONTENT USING A DONGLE DEVICE

(71) Applicant: Verizon Patent and Licensing Inc., Arlington, VA (US)

(72) Inventors: Nisheeth Gupta, Palo Alto, CA (US); Momin Mirza, Santa Clara, CA (US); Farooq Muzaffar, Palo Alto, CA (US); Neenu Sohi Kainth, Coppell, TX (US); Brian H. Whitton, Ridgefield, CT (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 38 days.

(21) Appl. No.: 14/309,220

(22) Filed: Jun. 19, 2014

(65) Prior Publication Data

US 2015/0373016 A1    Dec. 24, 2015

(51) Int. Cl.
*H04L 9/00* (2006.01)
*H04L 29/06* (2006.01)

(52) U.S. Cl.
CPC ........ *H04L 63/0853* (2013.01); *H04L 63/0876* (2013.01)

(58) Field of Classification Search
CPC .............. H04L 9/0819; H04L 63/0428; H04L 63/0853; H04L 63/0876; H04L 2209/24
See application file for complete search history.

(56) References Cited

U.S. PATENT DOCUMENTS

| 9,134,994 B2* | 9/2015 | Patel ......................... G06F 8/65 |
| 2008/0120341 A1* | 5/2008 | Takatsuka ......... G06F 17/30038 |
| 2008/0171561 A1* | 7/2008 | Irony .................. H04W 76/025 455/466 |
| 2010/0332819 A1* | 12/2010 | Guionnet ............. H04N 7/1675 713/150 |
| 2014/0283136 A1* | 9/2014 | Dougherty ................ G01S 5/00 726/29 |

OTHER PUBLICATIONS

Wikipedia, "Apple TV", http://en.wikipedia.org/wiki/Apple_tv, Jun. 19, 2014, 28 pages.
Wikipedia, "Chromecast", http://en.wikipedia.org/wiki/Chromecast, Jun. 15, 2014, 13 pages.
Wikipedia, "Roku", http://en.wikipedia.org/wiki/Roku, Jun. 12, 2014, 11 pages.
Wikipedia, "TiVo", http://en.wikipedia.org/wiki/Tivo, Mar. 23, 2014, 13 pages.
Wikipedia, "WhatsApp", http://en.wikipedia.org/wiki/WhatsApp, Jun. 19, 2014, 10 pages.

\* cited by examiner

*Primary Examiner* — Amir Mehrmanesh

(57) ABSTRACT

A content sharing device may receive, from a content providing device, information that identifies content to be shared with a dongle device via a content sharing service. The content sharing device may receive, from the content providing device, information that identifies a contact with which the content is to be shared. The content sharing device may determine, based on the information that identifies the contact, a dongle device identifier. The dongle device identifier may include a network address associated with the dongle device. The content sharing device may provide, to the dongle device and based on determining the dongle device identifier, information that identifies the content. The information that identifies the content may cause the content to be accessible by a content receiving device connected to the dongle device.

20 Claims, 16 Drawing Sheets

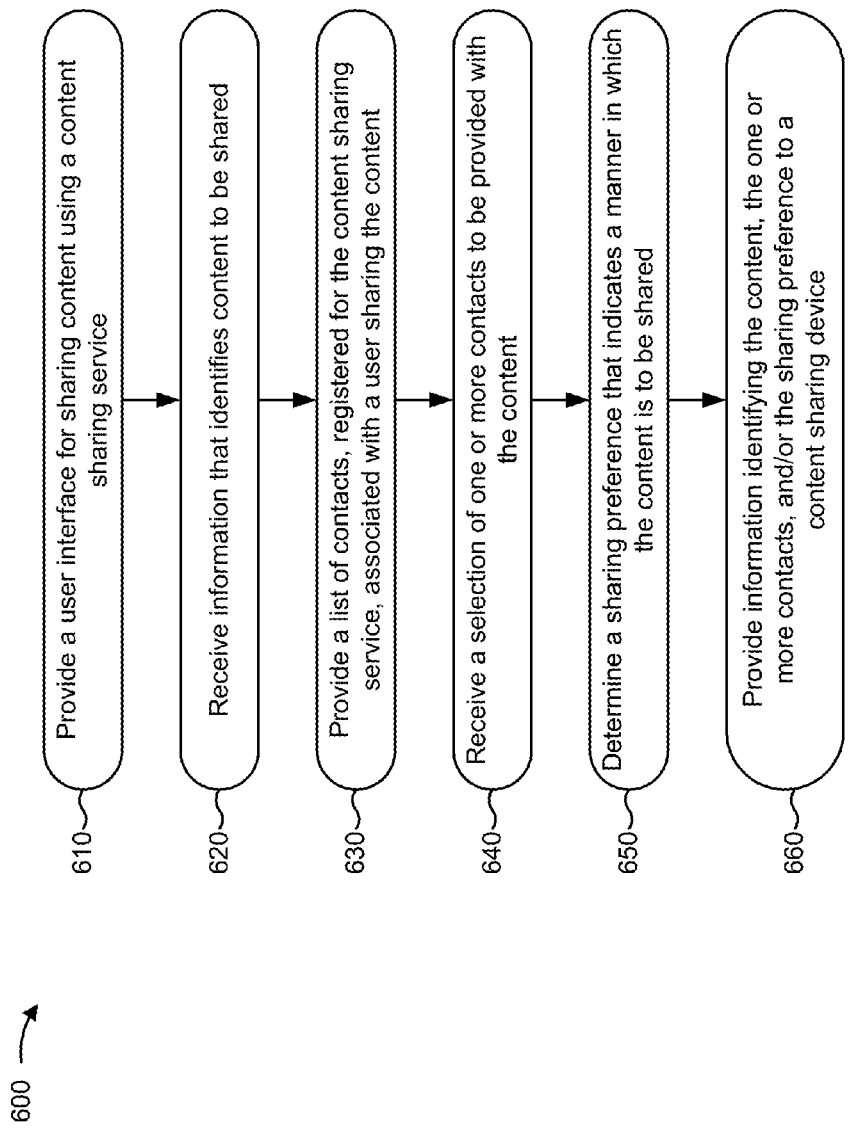

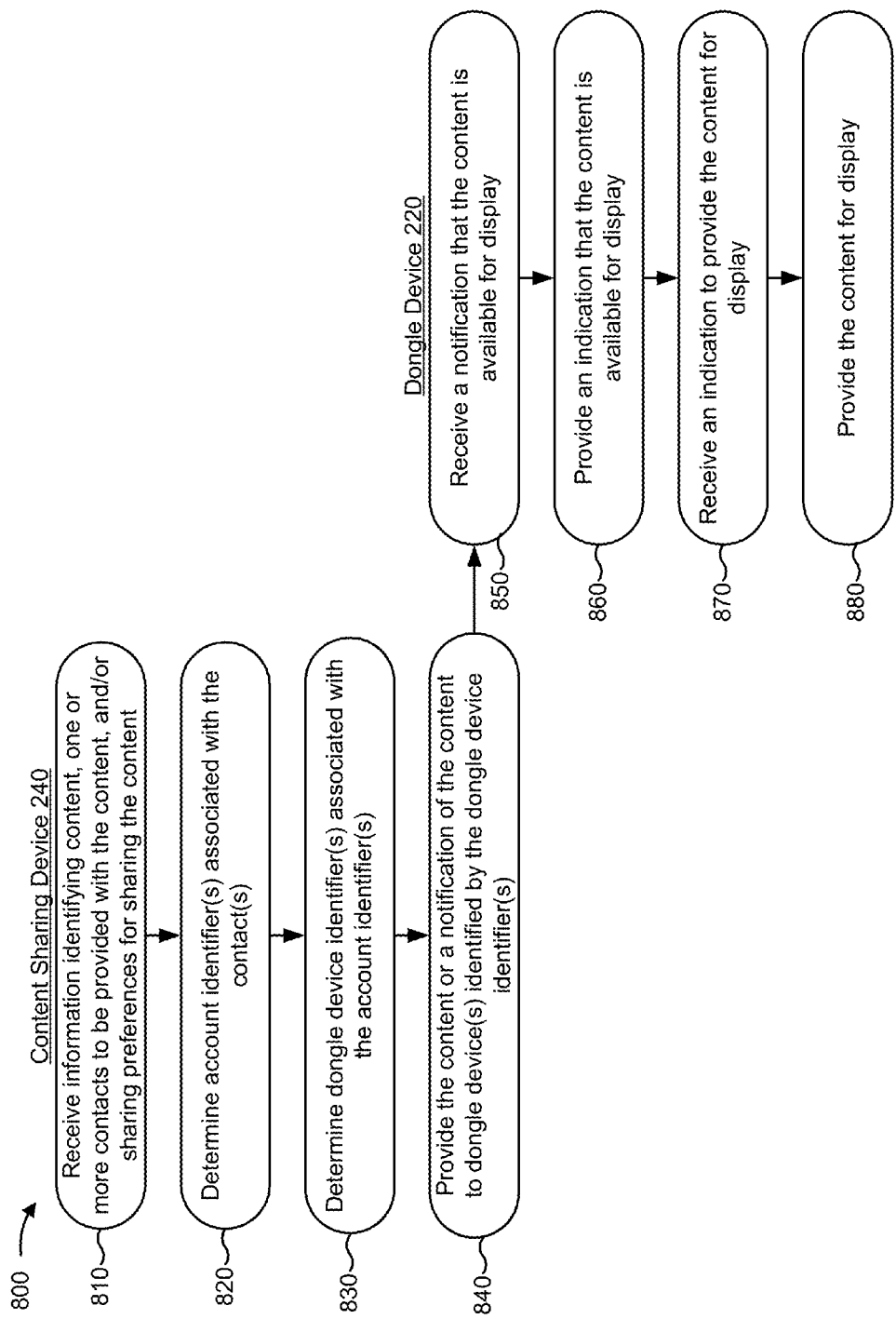

SHARING CONTENT USING A DONGLE DEVICE

BACKGROUND

A dongle is a small piece of hardware that can attach to a computer, a television, or another electronic device, and that, when attached, enables additional functions, such as copy protection, audio, video, games, data, or other services. These services may only be available when the dongle is attached. A dongle may be easily removed and replaced from electronic devices via an interface, such as a universal serial bus (USB) interface, a high-definition media interface (HDMI), a wireless interface, or the like.

BRIEF DESCRIPTION OF THE DRAWINGS

FIG. 6 is a flow chart of an example process for identifying content to be shared with a dongle device using a content sharing service;

FIG. 8 is a flow chart of an example process for sharing content with a dongle device using a content sharing service;

DETAILED DESCRIPTION OF PREFERRED EMBODIMENTS

The following detailed description of example implementations refers to the accompanying drawings. The same reference numbers in different drawings may identify the same or similar elements.

A user may want to share content, from a first device, with another user via a second device. For example, a user may want to share content from a phone or a computer to another user's television. Providing content from a user device to a television may be difficult, as the television may not have network access, may not be easily identified on a network, etc. Implementations described herein assist in sharing content between a content providing device, such as a smart phone, and a content receiving device, such as a television, using a dongle device that connects to the content receiving device.

Figure 1:
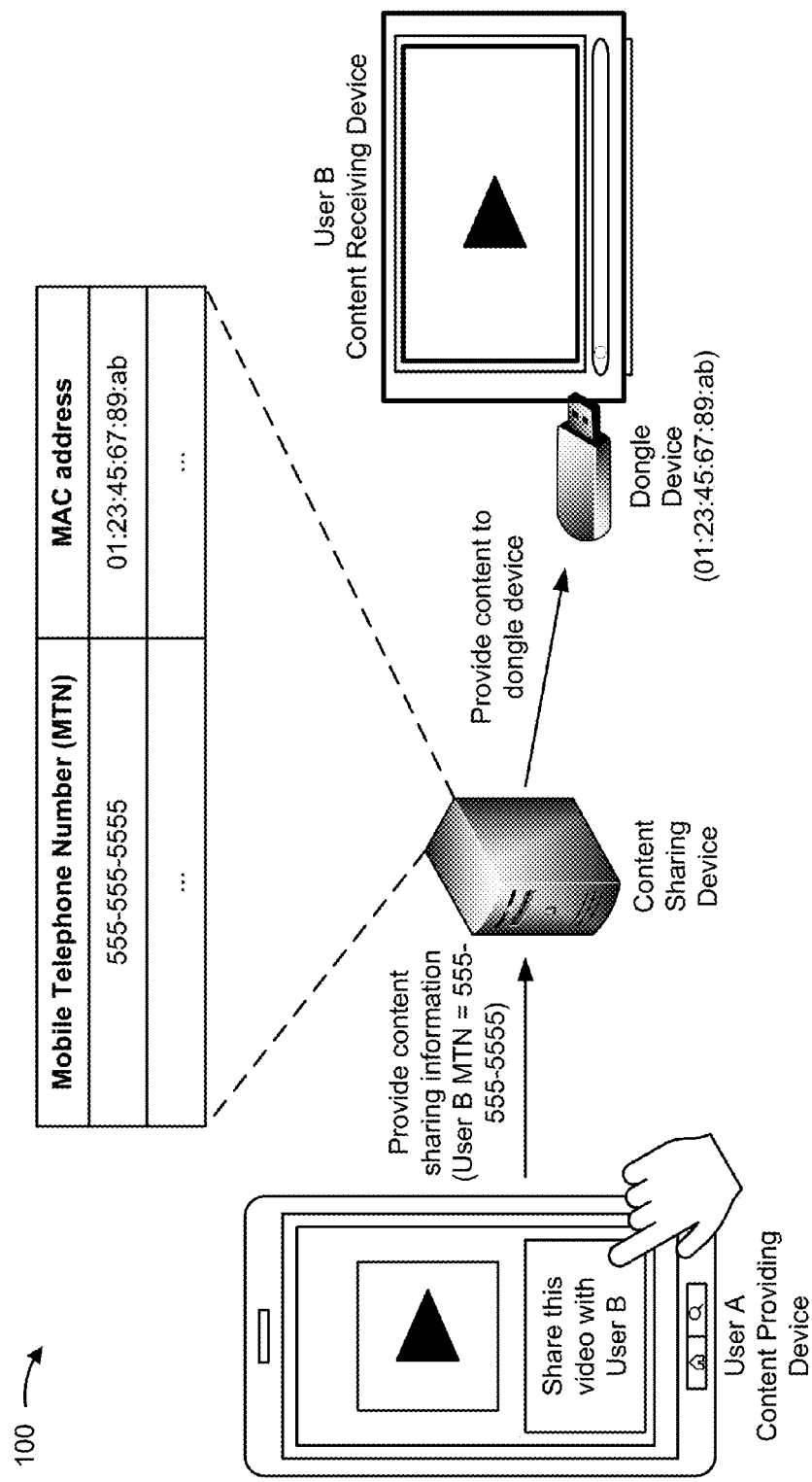
FIG. 1 is a diagram of an overview of an example implementation described herein.

FIG. 1 is a diagram of an overview of an example implementation 100 described herein. As shown in FIG. 1, assume that a first user, User A, interacts with a content providing device, such as the user's smart phone, to identify content to be shared with another user. For example, assume that User A identifies a video to be shared with User B. As further shown, assume that the content providing device provides content sharing information to a content sharing device. Assume that the content sharing information identifies a mobile telephone number (MTN) of User B, shown as 555-555-5555, and identifies the video to be shared.

As further shown in FIG. 1, assume that User B has previously registered a dongle device, identified by a media access control (MAC) address of 01:23:45:67:89:ab, with the content sharing device, and that the content sharing device stores a relationship between the MAC address and the MTN of User B. Thus, upon receiving the MTN of User B from the content providing device of User A, the content sharing device may identify the MAC address of the dongle device to which the video is to be provided. As shown, assume that the content sharing device provides the video to the dongle device, which is connected to a content receiving device associated with User B. Further, assume that the content receiving device provides the video for display. In this way, User A may easily share content with User B via a dongle device in communication with a content receiving device of User B.

Figure 2:
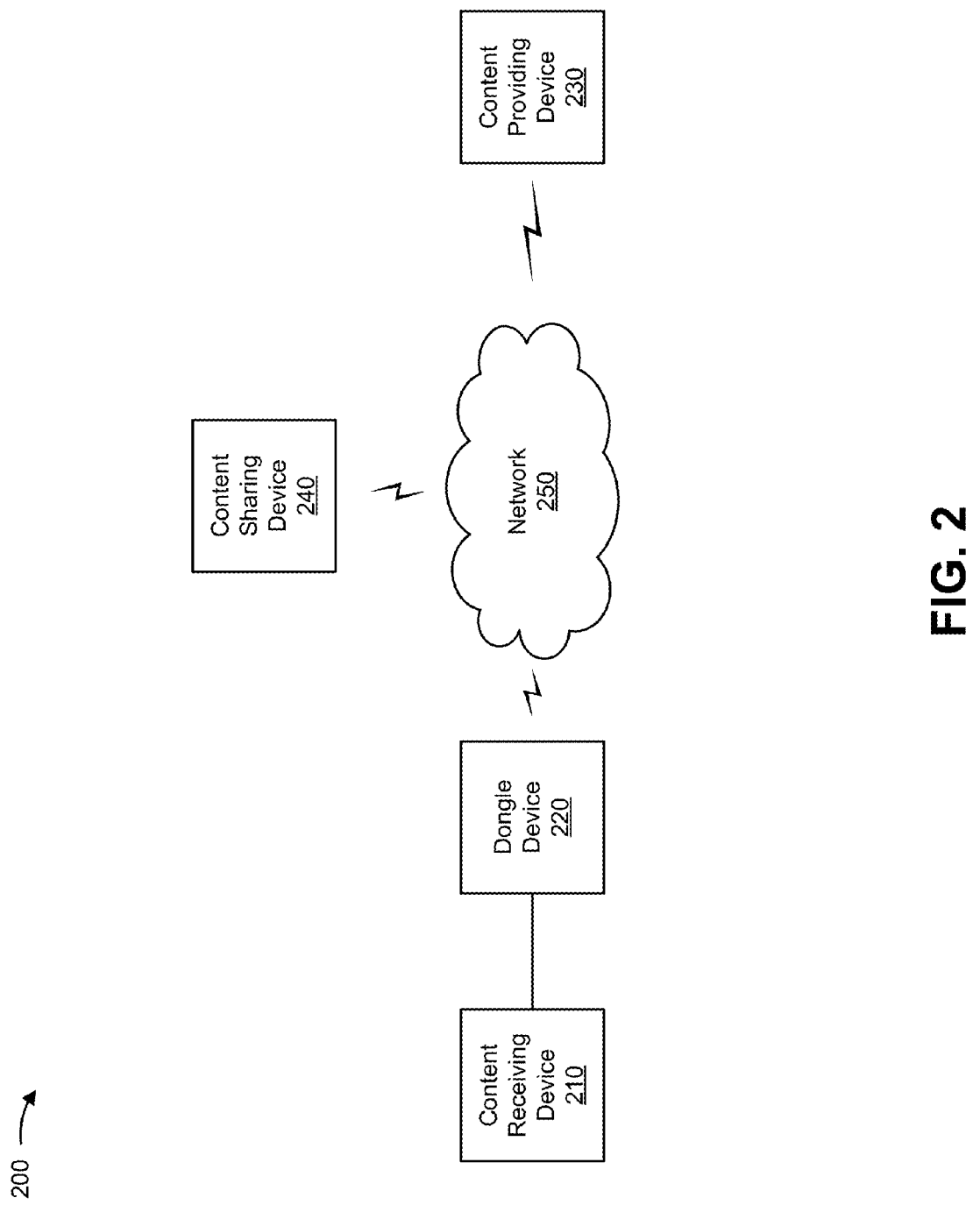
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a content receiving device 210, a dongle device 220, a content providing device 230, a content sharing device 240, and a network 250. Devices of environment 200 may interconnect via wired connections, wireless connections, or a combination of wired and wireless connections.

Content receiving device 210 may include one or more devices capable of receiving content (e.g., audio content, video content, text content, etc.) and outputting the content (e.g., via a display screen, a speaker, etc.). For example, content receiving device 210 may include a television, a computer (e.g., with a computer monitor), a phone (e.g., a smart phone), a gaming device, a projector, or a similar device. Content receiving device 210 may communicate with dongle device 220 to register for a content sharing service and/or to receive the content.

Dongle device 220 may include one or more devices capable of communicating via a network (e.g., network 250), such as to register for a content sharing service and/or to receive content. For example, dongle device 220 may include a USB dongle, an HDMI dongle, or the like. In some implementations, a user may interact with content receiving device 210 to register dongle device 220 with a content sharing service (e.g., via content sharing device 240). Additionally, or alternatively, dongle device 220 may receive content (e.g., from content sharing device 240 and/or content providing device 230), and may provide the content to content receiving device 210, which may output the content.

Content providing device 230 may include one or more device capable of providing content. For example, content providing device 230 may include a computer (e.g., a desktop computer, a laptop computer, etc.), a phone (e.g., a smart phone), a gaming device, a television, etc. In some implementations, a user may interact with content providing device 230 to identify content to be provided to content receiving device 210. Additionally, or alternatively, content providing device 230 may provide the content to content receiving device 210 with assistance from content sharing device 230. In some implementations, content providing device 230 may communicate with a dongle device 220 (e.g., different than dongle device 220 shown in FIG. 2) to communicate with content sharing device 240. While shown as separate devices, content providing device 230 and content receiving device 210 may be implemented within a single device, which may be capable of receiving and providing content as described herein.

Content sharing device 240 may include one or more devices capable of assisting content providing device 230 with providing content to content receiving device 210 (e.g., via dongle device 220). For example, content sharing device 240 may include a server device or another type of computing device. In some implementations, content sharing device 240 may store a relationship between a device identifier, that identifies dongle device 220, and an account identifier associated with a user of content receiving device 210. Content sharing device 240 may receive, from content providing device 230, information that identifies content to be provided to dongle device 220, and may receive information associated with the account identifier. Based on this information, content sharing device 240 may identify the device identifier of dongle device 220, and may provide the content to dongle device 220 (e.g., for output by content receiving device 210).

Network 250 may include one or more wired and/or wireless networks. For example, network 250 may include a cellular network, a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or another type of network.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
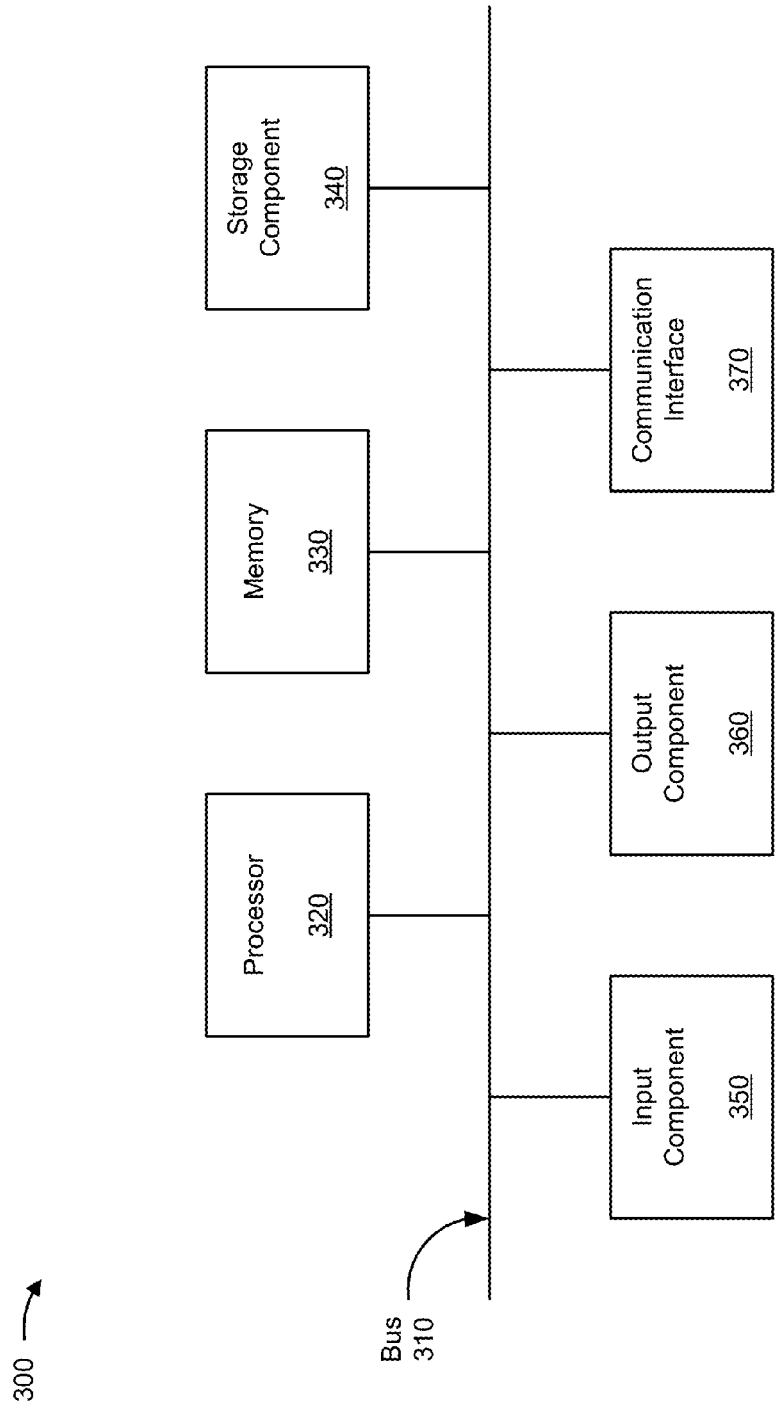
FIG. 3 is a diagram of example components of one or more devices of FIG. 2.

FIG. 3 is a diagram of example components of a device 300. Device 300 may correspond to content receiving device 210, dongle device 220, content providing device 230, and/or content sharing device 240. In some implementations, content receiving device 210, dongle device 220, content providing device 230, and/or content sharing device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
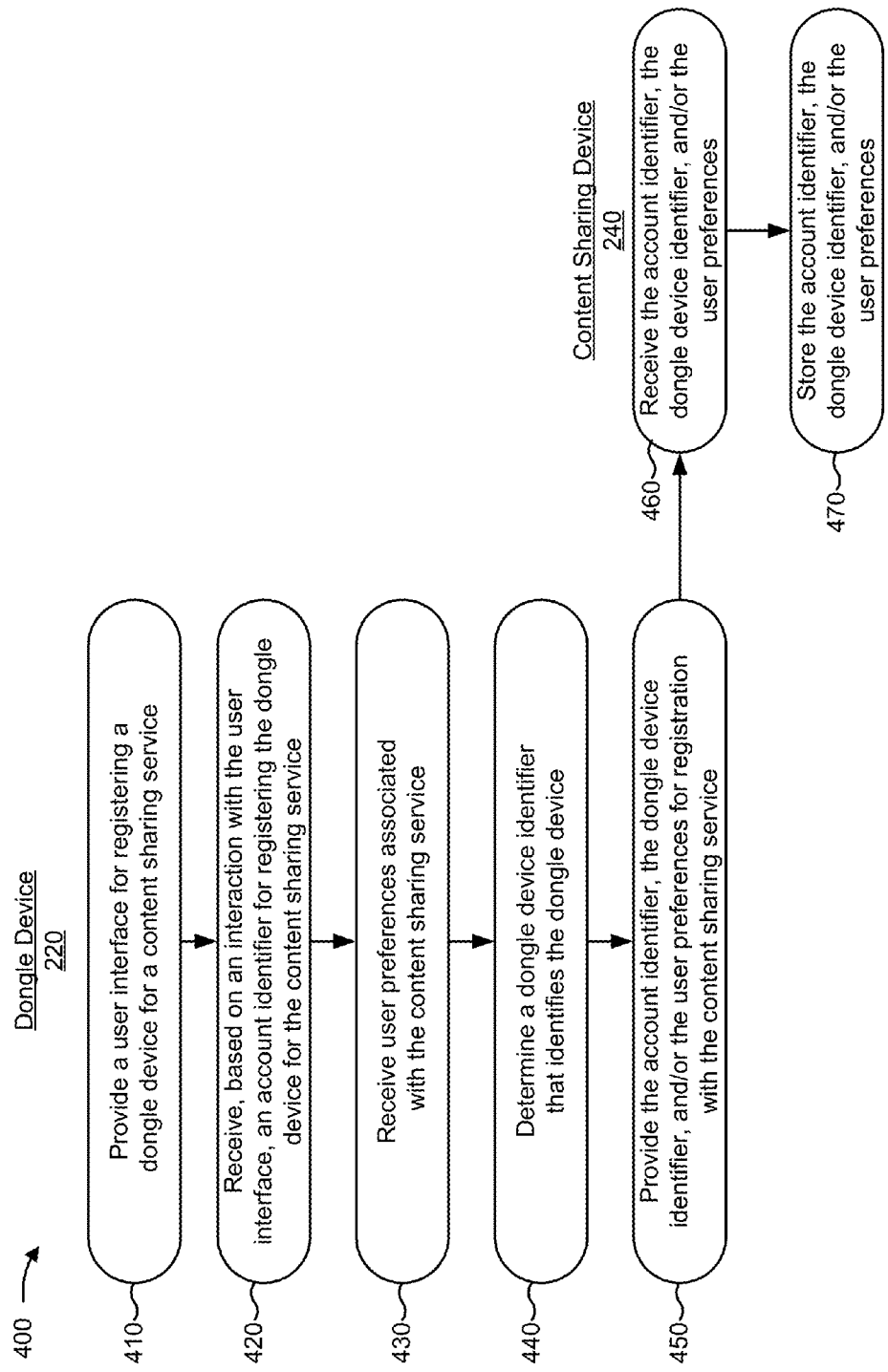
FIG. 4 is a flow chart of an example process for registering a dongle device for a content sharing service.

FIG. 4 is a flow chart of an example process 400 for registering a dongle device for a content sharing service. In some implementations, one or more process blocks of FIG. 4 may be performed by dongle device 220 and/or content sharing device 240. Additionally, or alternatively, one or more process blocks of FIG. 4 may be performed by another device or a group of devices separate from or including dongle device 220 and/or content sharing device 240, such as content receiving device 210 and/or content providing device 230.

As shown in FIG. 4, process 400 may include providing a user interface for registering a dongle device for a content sharing service (block 410). For example, dongle device 220 may provide information that may be used by content receiving device 210 to provide a user interface. For example, a user may connect dongle device 220 and content receiving device 210 (e.g., via a wired connection, a physical connection, a wireless connection, etc.). Dongle device 220 may provide, via the connection, information that causes content receiving device 210 to display a user interface for registering dongle device 220 for a content sharing service. In some implementations, the user may interact with content receiving device 210 (e.g., via a remote control, a display screen, an input device, etc.) to cause the user interface to be loaded from dongle device 220 and/or provided for display.

As further shown in FIG. 4, process 400 may include receiving, based on an interaction with the user interface, an account identifier for registering the dongle device for the content sharing service (block 420). For example, a user may interact with the user interface, provided via content receiving device 210, to input an account identifier. The account identifier may identify the user and/or an account associated with the user. For example, the account identifier may include a user identifier (e.g., a name, a username, a password, etc.), a telephone number (e.g., a mobile telephone number (MTN)) associated with the user, an international subscriber mobile identifier (IMSI) associated with the user, or the like. The account identifier may be received by dongle device 220 (e.g., based on the user interaction), and may be used to register dongle device 220 with a content sharing service (e.g., provided by content sharing device 240).

As further shown in FIG. 4, process 400 may include receiving user preferences associated with the content sharing service (block 430). For example, a user may interact with the user interface, provided via content receiving device 210, to input user preferences. The user preferences may control a manner in which a content sharing service handles content associated with the user. For example, a user preference may identify a parental control (e.g., block or allow adult content from being provided to content receiving device 210 associated with the user), may identify other users permitted to or blocked from providing content to content receiving device 210 associated with the user, or the like.

As further shown in FIG. 4, process 400 may include determining a dongle device identifier that identifies the dongle device (block 440). For example, dongle device 220 may be associated with a dongle device identifier. The dongle device identifier may include, for example, a network address, such as a MAC address, an internet protocol (IP) address, a device name, or the like. Dongle device 220 may determine a dongle device identifier with which dongle device 220 is associated by, for example, reading the dongle device identifier from a memory.

As further shown in FIG. 4, process 400 may include providing the account identifier, the dongle device identifier, and/or the user preferences for registration with the content sharing service (block 450). For example, dongle device 220 may provide the account identifier, the dongle device identifier, and/or information that identifies the user preferences to content sharing device 240 (e.g., via network 250). Dongle device 220 may provide this information to register for the content sharing service.

As further shown in FIG. 4, process 400 may include receiving the account identifier, the dongle device identifier, and/or the user preferences (block 460), and storing the account identifier, the dongle device identifier, and/or the user preferences (block 470). For example, content sharing device 240 may receive the account identifier, the dongle device identifier, and/or information that identifies the user preferences from dongle device 220 (e.g., via network 250). Content sharing device 240 may store this information, and may store a relationship between the account identifier, the dongle device identifier, and/or information that identifies the user preferences. In this way, content sharing device 240 may use the account identifier to identify dongle device 220 to which content is to be shared, and may share the content with dongle device 220 based on the user preferences.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
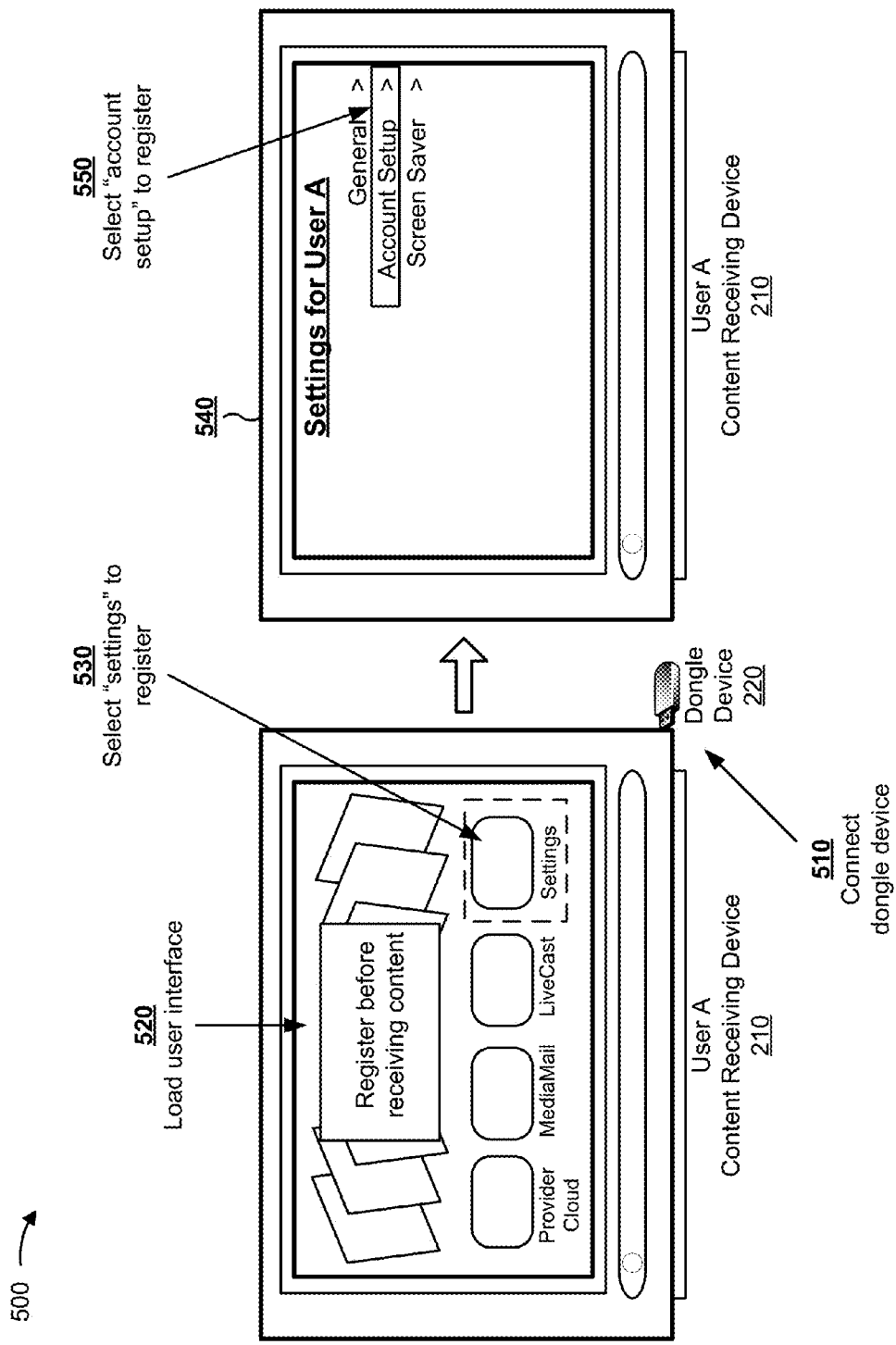
FIGS. 5A and 5B are diagrams of an example implementation relating to the example process shown in FIG. 4.
Figure 5B:
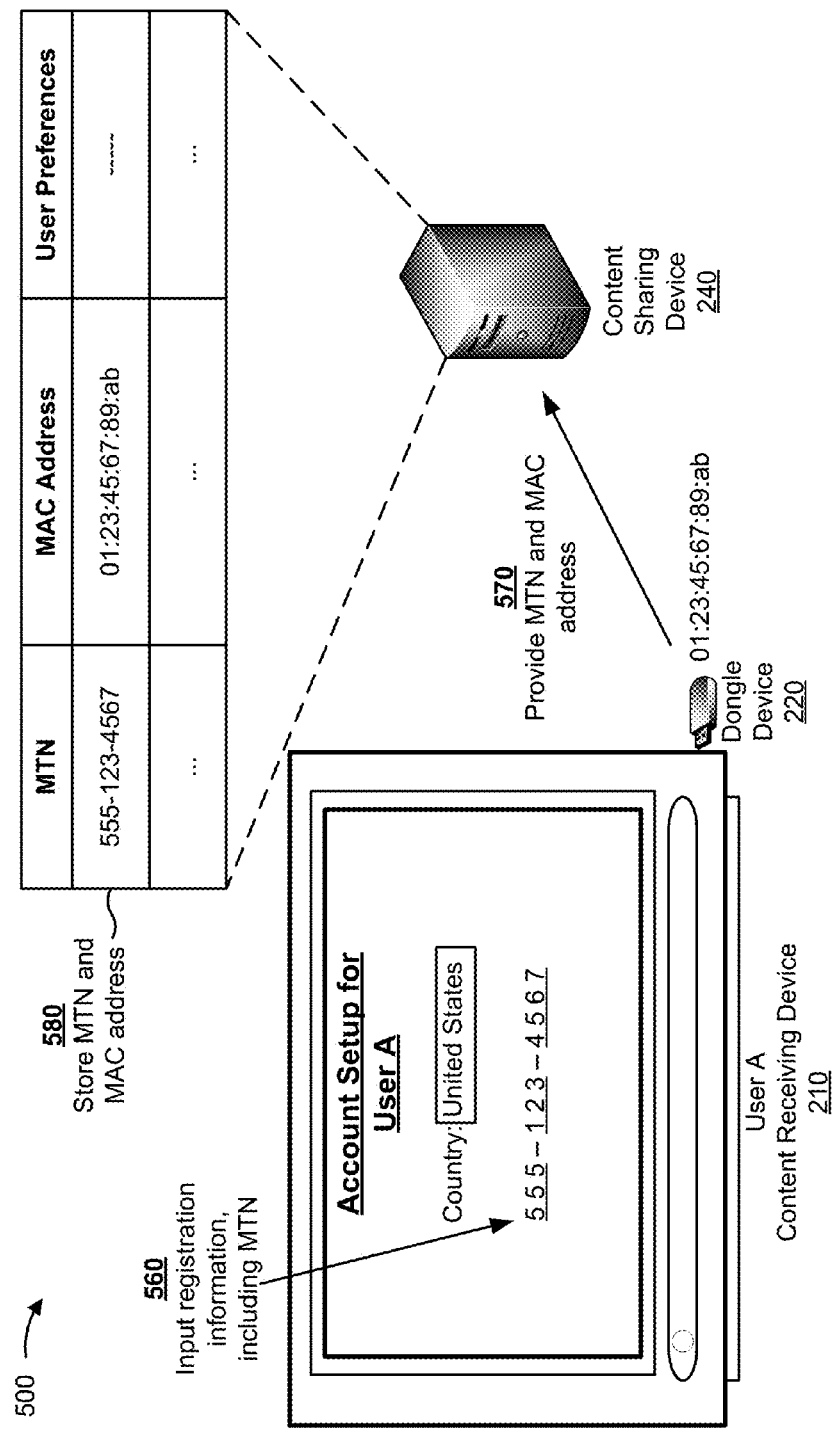

FIGS. 5A and 5B are diagrams of an example implementation 500 relating to example process 400 shown in FIG. 4. FIGS. 5A and 5B show an example of registering a dongle device for a content sharing service.

As shown in FIG. 5A, and by reference number 510, assume that a user, identified as User A, connects dongle device 220 to content receiving device 210 associated with User A. As shown by reference number 520, assume that content receiving device 210 loads a user interface from dongle device 220. Assume that the user interface permits User A to receive content from other users after registering for a content sharing service. As shown by reference number 530, assume that User A selects (e.g., using a remote control or another input device) a "settings" input mechanism. Based on this user interaction, assume that content receiving device 210 provides a settings user interface for display, as shown by reference number 540. As shown by reference number 550, assume that User A interacts with an "account setup" input mechanism to cause content receiving device 210 to display a user interface for inputting an account identifier.

As shown in FIG. 5B, assume that user interaction with the "account setup" input mechanism causes content receiving device 210 to provide an account setup user interface. As shown by reference number 560, assume that the user interacts with the account setup user interface to input an account identifier, shown as a mobile telephone number of "555-123-4567." In some implementations, the user may input a geographic region, which may be used in connection with the mobile telephone number to generate an account identifier (e.g., 1-555-123-4567, with 1 being the mobile country code for the United States). Assume that the input account identifier is received by dongle device 220.

As shown by reference number 570, assume that dongle device 220 provides the MTN (e.g., 555-123-4567) and a MAC address associated with dongle device 220 (e.g., 01:23:45:67:89:ab) to content sharing device 240. As shown by reference number 580, assume that content sharing device 240 stores the MTN, the MAC address, and an indication of a relationship between the MTN and the MAC address (e.g., using a data structure). In example implementation 500, assume that User A does not input any user preferences. Content sharing device 240 may use the relationship between the MTN and the MAC address to assist in providing content to dongle device 220 associated with User A, as described in more detail elsewhere herein.

As indicated above, FIGS. 5A and 5B are provided merely as an example. Other examples are possible and may differ from what was described with regard to FIGS. 5A and 5B.

FIG. 6 is a flow chart of an example process 600 for identifying content to be shared with a dongle device using a content sharing service. In some implementations, one or more process blocks of FIG. 6 may be performed by content providing device 230. In some implementations, one or more process blocks of FIG. 6 may be performed by another device or a group of devices separate from or including content providing device 230, such as content receiving device 210, dongle device 220, and/or content sharing device 240.

As shown in FIG. 6, process 600 may include providing a user interface for sharing content using a content sharing service (block 610). For example, content providing device 230 may provide a user interface that permits a user to input information identifying content to be shared, contacts with whom the content is to be shared, a sharing preference for sharing the content, etc. In some implementations, content providing device 230 may download, install, and/or execute a content sharing application that provides the user interface and/or that assists in providing the content sharing service.

As further shown in FIG. 6, process 600 may include receiving information that identifies content to be shared (block 620). For example, a user may interact with the user interface to provide information that identifies content to be shared, and content providing device 230 may receive this information. In some implementations, the content may be stored locally by content providing device 230. Additionally, or alternatively, the content may be stored remotely by another device, such as content sharing device 240, by another device associated with the user, by a device associated with a cloud computing environment, or the like.

The content may include, for example, audio content, video content, text content, image content, etc. In some implementations, the user interface may permit the user to browse content (e.g., stored locally or remotely) and/or to select content to be shared. Additionally, or alternatively, the user may identify the content using a filename and/or another content identifier.

As further shown in FIG. 6, process 600 may include providing a list of contacts, registered for the content sharing service, associated with a user sharing the content (block 630). For example, content receiving device 230 may provide a list of contacts for display. The list of contacts may include contact identifiers (e.g., a name, a username, a nickname, etc.) for users that are registered for the content sharing service, and/or that are associated with the user sharing the content. For example, the list of contacts may include names and/or MTNs stored in a memory accessible by content providing device 230 (e.g., a smart phone).

In some implementations, content providing device 230 may request and/or receive (e.g., from content sharing device 240) information that identifies which contacts, associated with the user, are registered for the content sharing service. For example, content providing device 230 may provide MTNs, associated with the contacts, to content sharing device 240. Content sharing device 240 may determine whether the MTNs are stored in a data structure associated with the content sharing service, and may provide an indication of which MTNs are registered for the content sharing service (and/or which MTNs are not registered for the content sharing service). Based on this information, content providing device 230 may store a registration indication in association with the contact, which may indicate whether the contact is registered for the content sharing service.

If a contact is registered for the content sharing service, then content providing device 230 may provide a contact identifier for display via the user interface, which may permit the user to share content with the contact. If a contact is not registered for the content sharing service, then content providing device 230 may prevent a contact identifier from being displayed via the user interface. Alternatively, if the contact is not registered, a contact identifier may be displayed, and selection of the contact may cause a message to be sent to a user device (e.g., a mobile phone) associated with the contact, requesting that the contact register for the content sharing service.

As further shown in FIG. 6, process 600 may include receiving a selection of one or more contacts to be provided with the content (block 640). For example, content providing device 230 may receive, based on user interaction with the user interface, information that identifies contacts to which the content is to be provided. For example, the user may select or deselect a contact, may input a name of a contact to which content is to be provided, or the like.

As further shown in FIG. 6, process 600 may include determining a sharing preference that indicates a manner in which the content is to be shared (block 650). For example, content providing device 230 may receive, based on a user interaction with the user interface, information that identifies a sharing preference. A sharing preference may identify a manner in which the content is to be shared with a contact. As an example, the sharing preference may indicate that the contact is to be permitted to access the content at any time, a particular quantity of times, for a limited period of time, during a particular time period, etc.

In some implementations, the sharing preference may indicate that the contact is permitted to control a manner in which the content is provided for display without receiving control instructions from content providing device 230 (e.g., giving the contact control of video features, such as play, stop, pause, rewind, fast forward, etc.). For example, the contact may use dongle device 220 to access the content at the contact's convenience (e.g., without the content being streamed from content providing device 230). This sharing preference may be referred to in some examples as "MediaMail."

Additionally, or alternatively, the sharing preference may indicate that the contact cannot control a manner in which the content is provided for display, and that the content is to be controlled based on control instructions received from content providing device 230 (e.g., to give the user control of video features, such as pause, stop, play, etc.). For example, the contact may be prevented from playing the content (e.g., displaying and/or controlling playback) via dongle device 220 unless content providing device 230 is streaming the content. This sharing preference may be referred to in some examples as "LiveCast."

As further shown in FIG. 6, process 600 may include providing information identifying the content, the one or more contacts, and/or the sharing preferences to a content sharing device (block 660). For example, content providing device 230 may provide, to content sharing device 240, information identifying the content, the one or more contacts, and/or the sharing preferences. In some implementations, the information identifying the content may include the content itself, which may be provided to content sharing device 240 by content providing device 230. Additionally, or alternatively, the information identifying the content may identify a location (e.g., a network address, a web site, a memory location, etc.) where the content may be accessed by content sharing device 240. In this way, content sharing device 240 may assist content providing device 230 with providing content to content receiving device 210, as described in more detail elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
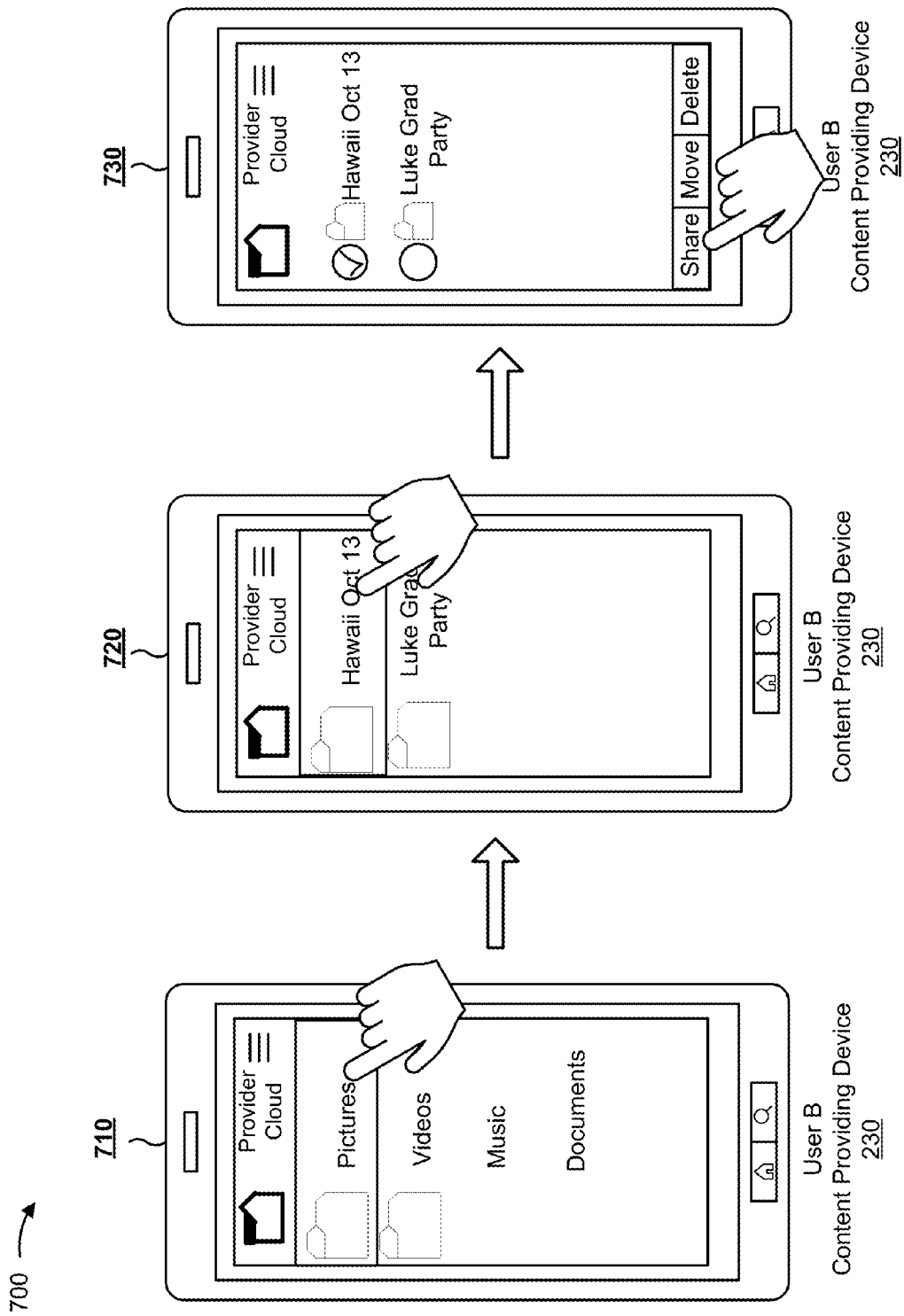
FIGS. 7A and 7B are diagrams of an example implementation relating to the example process shown in FIG. 6.
Figure 7B:
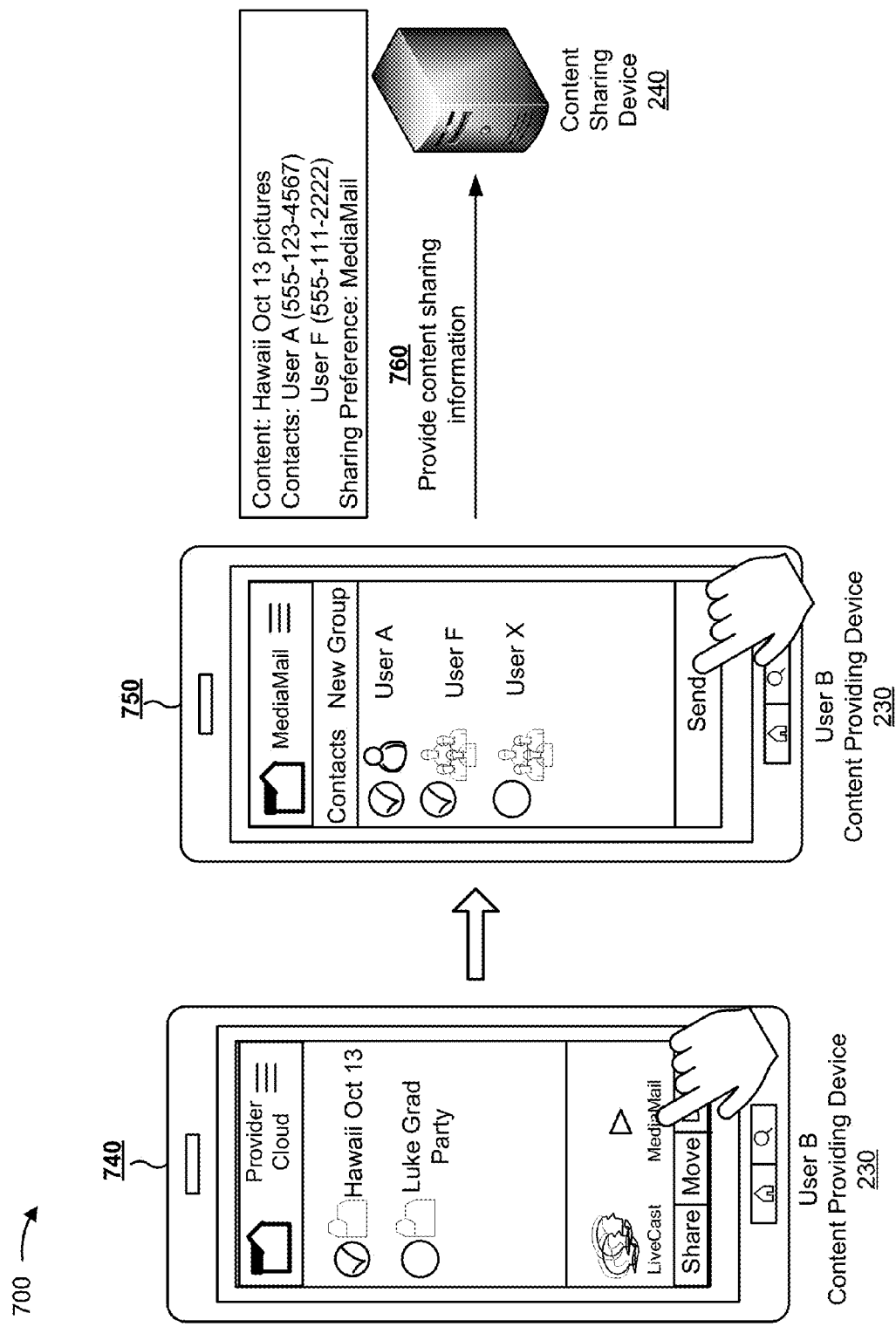

FIGS. 7A and 7B are diagrams of an example implementation 700 relating to example process 600 shown in FIG. 6. FIGS. 7A and 7B show an example of identifying content to be shared with a dongle device using a content sharing service.

As shown in FIG. 7A, assume that User B interacts with content providing device 230, such as User B's smart phone, to identify content to be shared with a dongle device using a content sharing service. As shown by reference number 710, assume that User B interacts with a content sharing application that permits User B to browse and/or select content. For example, the user interface may allow User B to select content from a cloud service, from pictures accessible by content providing device 230, from videos accessible by content providing device 230, from music accessible by content providing device 230, from documents accessible by content providing device 230, etc. As shown, assume that User B selects to browse picture content.

As shown by reference number 720, based on the user interaction, assume that the content sharing application provides two folders that store pictures that may be shared. As further shown, assume that User B interacts with the user interface to select a folder labeled "Hawaii Oct 13" to be shared. As shown by reference number 730, assume that content providing device 230 provides an indication that the "Hawaii Oct 13" folder has been selected, and that User B interacts with a "Share" button to provide an indication to share the content.

As shown in FIG. 7B, and by reference number 740, assume that User B's interaction with the "Share" button causes the user interface to display options for sharing preferences, shown as "LiveCast" and "MediaMail." As shown, assume that User B selects to share the content via Media-Mail. As shown by reference number 750, assume that this user interaction causes the user interface to display a list of contacts, associated with User B (e.g., stored in a memory accessible by content providing device 230), that are registered for the content sharing service. As shown, assume that User B selects to share the content (pictures in the "Hawaii Oct 13" folder) with User A and User F. Further, assume that User B interacts with a "Send" button to send the content.

As shown by reference number 760, assume that this user interaction causes content providing device 230 to provide content sharing information to content sharing device 240. For example, content providing device 230 may provide the content (e.g., the pictures stored in the "Hawaii Oct 13" folder) and/or information identifying the content (e.g., a cloud storage location where the pictures can be accessed), may provide information identifying the contacts with which the content is to be shared (e.g., a contact identifier, such as "User A" and "User F", and/or an account identifier associated with the contacts, such as an MTN of "555-123-4567" and "555-111-2222"), and may provide information identifying a sharing preference for sharing the content (e.g., via "MediaMail"). Content sharing device 240 may use this information to assist in sharing the content with dongle devices 220 associated with the contacts, as described in more detail elsewhere herein.

As indicated above, FIGS. 7A and 7B are provided merely as an example. Other examples are possible and may differ from what was described with regard to FIGS. 7A and 7B.

FIG. 8 is a flow chart of an example process 800 for sharing content with a dongle device using a content sharing service. In some implementations, one or more process blocks of FIG. 8 may be performed by content sharing device 240 and/or dongle device 220. In some implementations, one or more process blocks of FIG. 8 may be performed by another device or a group of devices separate from or including content sharing device 240 and/or dongle device 220, such as content receiving device 210 and/or content providing device 230.

As shown in FIG. 8, process 800 may include receiving information identifying content, one or more contacts to be provided with the content, and/or sharing preferences for sharing the content (block 810). For example, content sharing device 240 may receive, from content providing device 230, information identifying the content. In some implementations, content sharing device 240 may receive the content from content providing device 230. Additionally, or alternatively, content sharing device 240 may receive information identifying a location from which the content can be accessed, and may access the content from the location.

Content sharing device 240 may receive, from content providing device 230, information identifying one or more contacts to be provided with the content, in some implementations. For example, content sharing device 240 may receive a MTN associated with the contact. As another example, content sharing device 240 may receive another contact identifier that may be used to determine a dongle device identifier associated with the contact (e.g., a contact name, a dongle device identifier, etc.).

Content sharing device 240 may receive, from content providing device 230, information identifying a sharing preference for sharing the content, in some implementations. For example, content sharing device 240 may receive an indication of whether the content is to be shared using a LiveCast sharing service, a MediaMail sharing service, or another sharing service.

As further shown in FIG. 8, process 800 may include determining account identifier(s) associated with the contact(s) (block 820). For example, content sharing device 240 may determine account identifiers associated with each contact identified by content providing device 230. In some implementations, content sharing device 240 may receive an account identifier from content providing device 230. For example, an MTN may be used as an account identifier, and content providing device 230 may provide MTNs, for selected contacts, to content sharing device 240. Additionally, or alternatively, content sharing device 240 may determine an account identifier based on information received from content providing device 230. For example, content providing device 230 may provide a contact identifier (e.g., a contact name) to content sharing device 240, and content sharing device 240 may search a data structure, using the contact identifier, to determine the account identifier.

As further shown in FIG. 8, process 800 may include determining dongle device identifier(s) associated with the account identifier(s) (block 830). For example, content sharing device 240 may determine a respective dongle device identifier associated with each contact identified by content providing device 230. In some implementations, content sharing device 240 may receive the dongle device identifier from content providing device 230. Additionally, or alternatively, content sharing device 240 may use an account identifier, associated with a contact, to determine a dongle device identifier associated with the contact. For example, content sharing device 240 may search a data structure, using an account identifier (e.g., an MTN), to identify a dongle device identifier (e.g., a network address, such as a MAC address).

As further shown in FIG. 8, process 800 may include providing the content or a notification of the content to dongle device(s) identified by the dongle device identifier(s) (block 840). For example, content sharing device 240 may provide, to dongle device(s) 220 associated with each contact identified by content providing device 230, the content or a notification that the content is available. In some implementations, content sharing device 240 may provide the content itself (e.g., for storage by dongle device 220). Additionally, or alternatively, content sharing device 240 may provide information that identifies a location (e.g., a network address, a memory location, etc.) where the content can be accessed by dongle device 220. Additionally, or alternatively, content sharing device 240 may provide a notification that the content is available, so that a user associated with dongle device 220 may interact with dongle device 220 (e.g., via content receiving device 210) to access the content.

Content sharing device 240 may provide the above information using a dongle device identifier associated with dongle device 220. For example, the dongle device identifier may include a network address, and content sharing device 240 may provide the information to the network address (e.g., by identifying the network address as a destination for a packet that includes the information). Additionally, or alternatively, content sharing device 240 may perform transcoding operations, formatting operations, caching operations, billing operations, etc. for the content.

In some implementations, content sharing device 240 may provide the dongle device identifier to content providing device 230, and content providing device 230 may communicate with dongle device 220 (e.g., to provide the content, a notification of the content, etc.).

As further shown in FIG. 8, process 800 may include receiving a notification that the content is available for display (block 850), and providing an indication that the content is available for display (block 860). For example, dongle device 220 may receive, from content sharing device 240, the content, a location where the content may be accessed, a notification that the content is available, etc. Based on this information, dongle device 220 may provide an indication that content is available for display.

In some implementations, dongle device 220 may provide an indication that content is available for display. For example, dongle device 220 may provide the indication via a user interface of content receiving device 210 (e.g., "You have content available via the content sharing service."). Additionally, or alternatively, dongle device 220 may provide the indication by lighting up (e.g., lighting up an LED of dongle device 220), by vibrating, by emitting a sound (e.g., a beep), etc.

As further shown in FIG. 8, process 800 may include receiving an indication to provide the content for display (block 870), and providing the content for display (block 880). For example, dongle device 220 may receive, via a user interaction with a user interface of content receiving device 210, an indication to provide the content for display. In some implementations, content receiving device 210 may provide a menu that permits a receiving user to interact with a content sharing service. As an example, the receiving user may access the menu, may receive a notification that content is being shared with the receiving user (e.g., a notification that content is being shared via LiveCast, via MediaMail, etc.), and may interact with the user interface to cause a preview of available content to be displayed (e.g., a thumbnail, a video clip, etc.). Additionally, or alternatively, the menu may provide information identifying a sharing user that is sharing the content with the receiving user.

The receiving user may select information associated with the shared content (e.g., a thumbnail, a name of the sharing user, etc.), and dongle device 220 may provide the content to content receiving device 210 for display. In some implementations, such as when the content is shared via MediaMail, the receiving user may control playing (e.g., displaying and/or playback) of the content (e.g., a picture slideshow, video playback, etc.). In some implementations, such as when the content is shared via LiveCast, the receiving user may not control playing of the content, and the sharing user may control playing of the content on content receiving device 210 of the receiving user. As another example, the receiving user may not control playing of the content when the content is shared via MediaMail, and may control playing of the content when the content is shared via LiveCast.

Additionally, or alternatively, dongle device 220 may store the content and/or information identifying a location where the content may be accessed so that the content may be played later. The receiving user may interact with dongle device 220 (e.g., via content receiving device 210) to delete the content, to share the content with other users (e.g., if given permission in the sharing preferences of the sharing user), to modify the content (e.g., if given permission in the sharing preferences), etc. In this way, a sharing user may share personal content with a receiving user via dongle device 220 in communication with content receiving device 210 (e.g., a television).

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
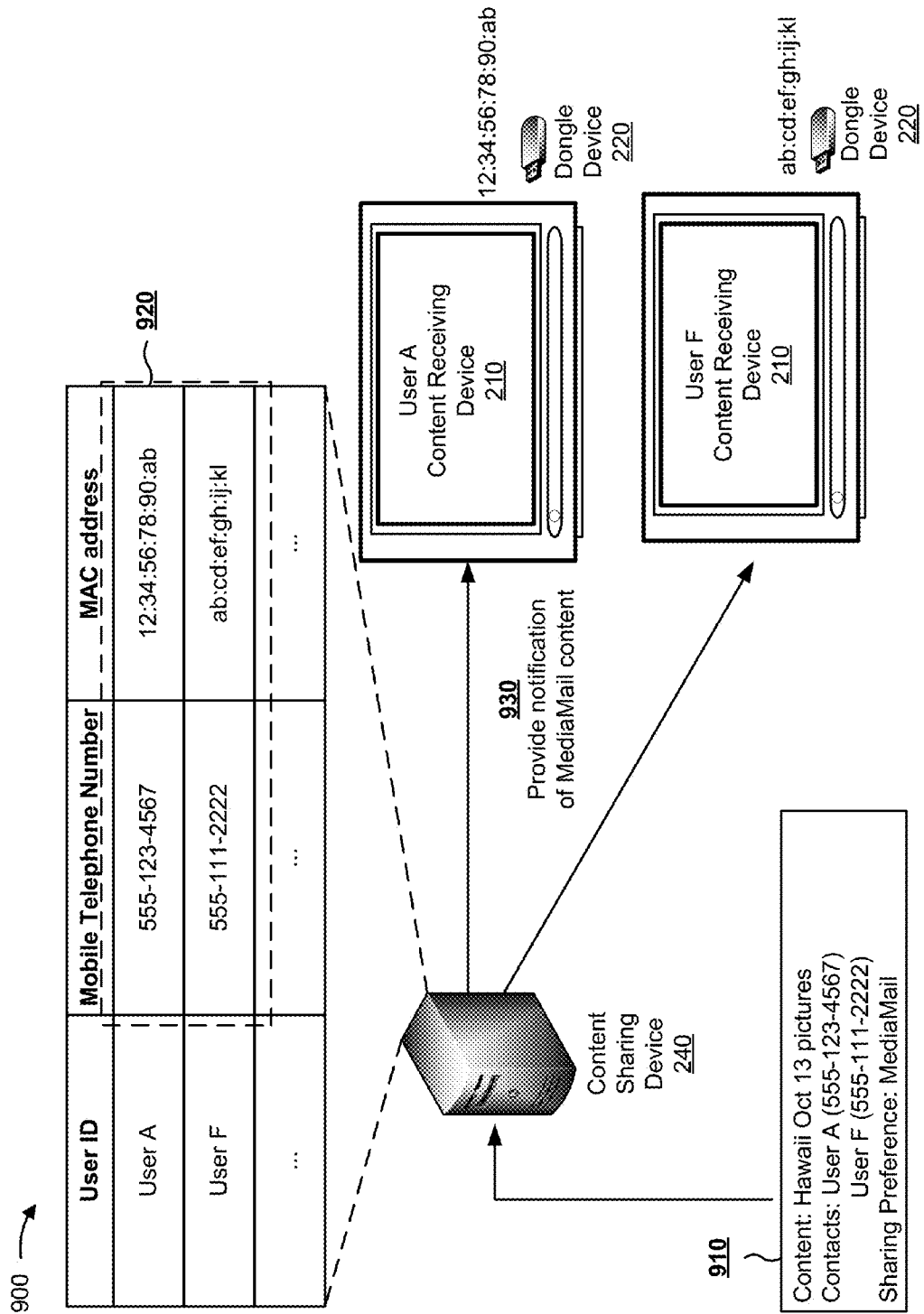
FIGS. 9A-9C are diagrams of an example implementation relating to the example process shown in FIG. 8.
Figure 9B:
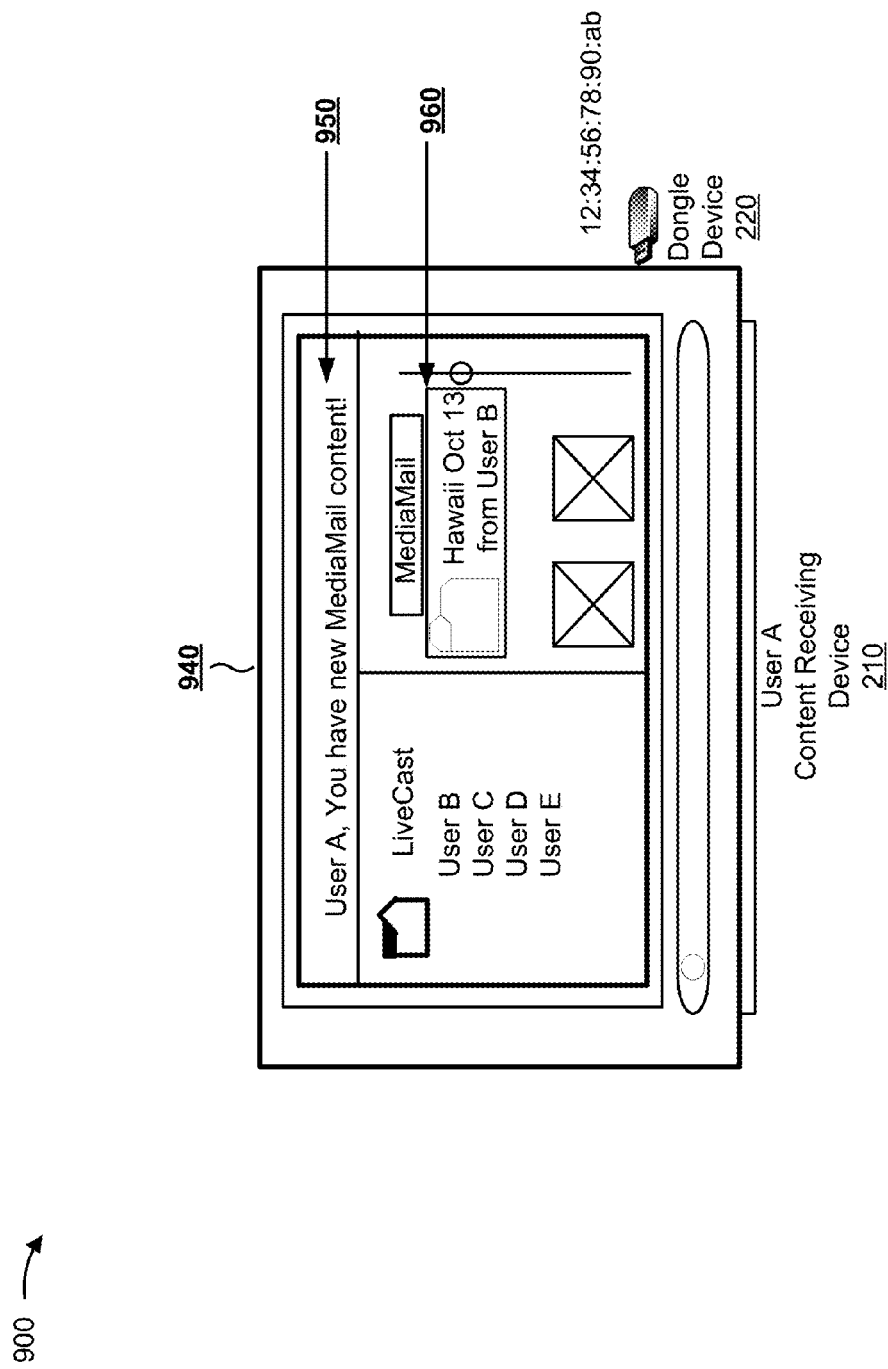
Figure 9C:
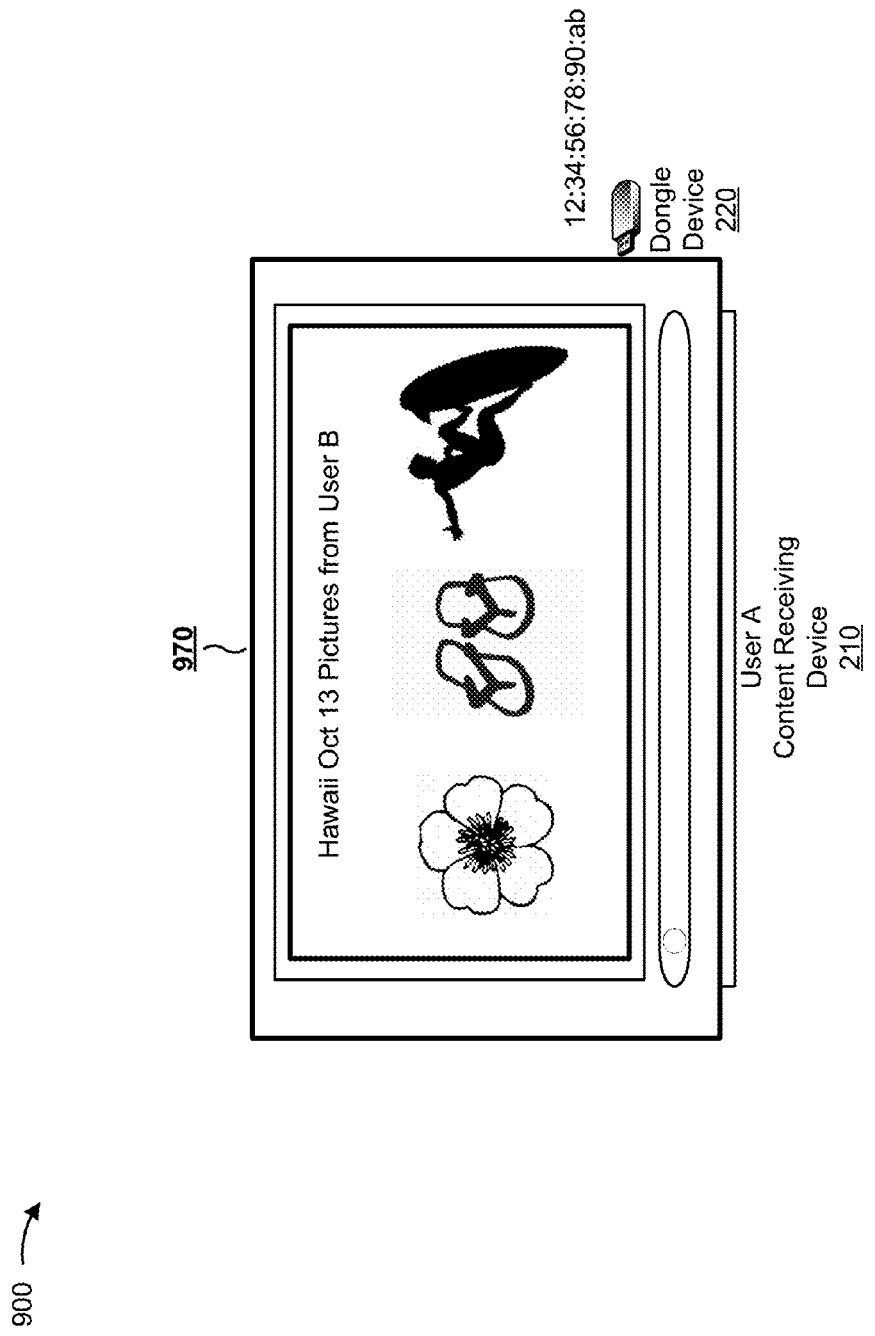

FIGS. 9A-9C are diagrams of an example implementation 900 relating to example process 800 shown in FIG. 8. FIGS. 9A-9C show an example of sharing content with a dongle device using a content sharing service. For the purpose of FIGS. 9A-9C, assume that the operations described herein in connection with FIGS. 5A, 5B, 7A, and 7B have been performed.

As shown in FIG. 9A, and by reference number 910, assume that content sharing device 240 receives, from content providing device 230, content sharing information that identifies content to be shared (e.g., "Hawaii Oct 13 pictures") with two users, identified as User A and User F. Further, assume that the content sharing information indicates that the content is to be shared using a MediaMail service. Further, assume that the content sharing information identifies an MTN associated with User A (e.g., 555-123-4567) and an MTN associated with User F (e.g., 555-111-2222).

As shown by reference number 920, assume that content sharing device 240 uses the MTNs to determine a MAC address that identifies dongle device 220 associated with User A (e.g., 12:34:56:78:90:ab) and a MAC address that identifies dongle device 220 associated with User F (e.g., ab:cd:ef:gh:ij:kl). As shown by reference number 930, assume that content sharing device 240 uses these MAC addresses to provide a notification of the MediaMail content to dongle devices 220 associated with these MAC addresses. As shown, assume that dongle device 220 associated with User A is in communication with User A's content receiving device 210 (e.g., User A's television) and that dongle device 220 associated with User F is in communication with User F's content receiving device 210 (e.g., User F's television).

As shown in FIG. 9B, and by reference number 940, assume that User A accesses a menu associated with the content sharing service. Based on receiving the notification from content sharing device 240, assume that dongle device 220 provides, for display on content receiving device 210, a notification that shared content is available, as shown by reference number 950 (e.g., "User A, You have new MediaMail content!"). As shown by reference number 960, assume that User A navigates through the menu to access MediaMail content, and selects the Hawaii Oct 13 pictures shared by User B.

As shown in FIG. 9C, and by reference number 970, assume that User A's interaction with the menu causes dongle device 220 to provide, for display via content receiving device 210, the Hawaii Oct 13 pictures shared by User B. In this way, dongle device 220 may assist in easily sharing content between a user device to a television, as an example.

As indicated above, FIGS. 9A-9C are provided merely as an example. Other examples are possible and may differ from what was described with regard to FIGS. 9A-9C.

Figure 10A:
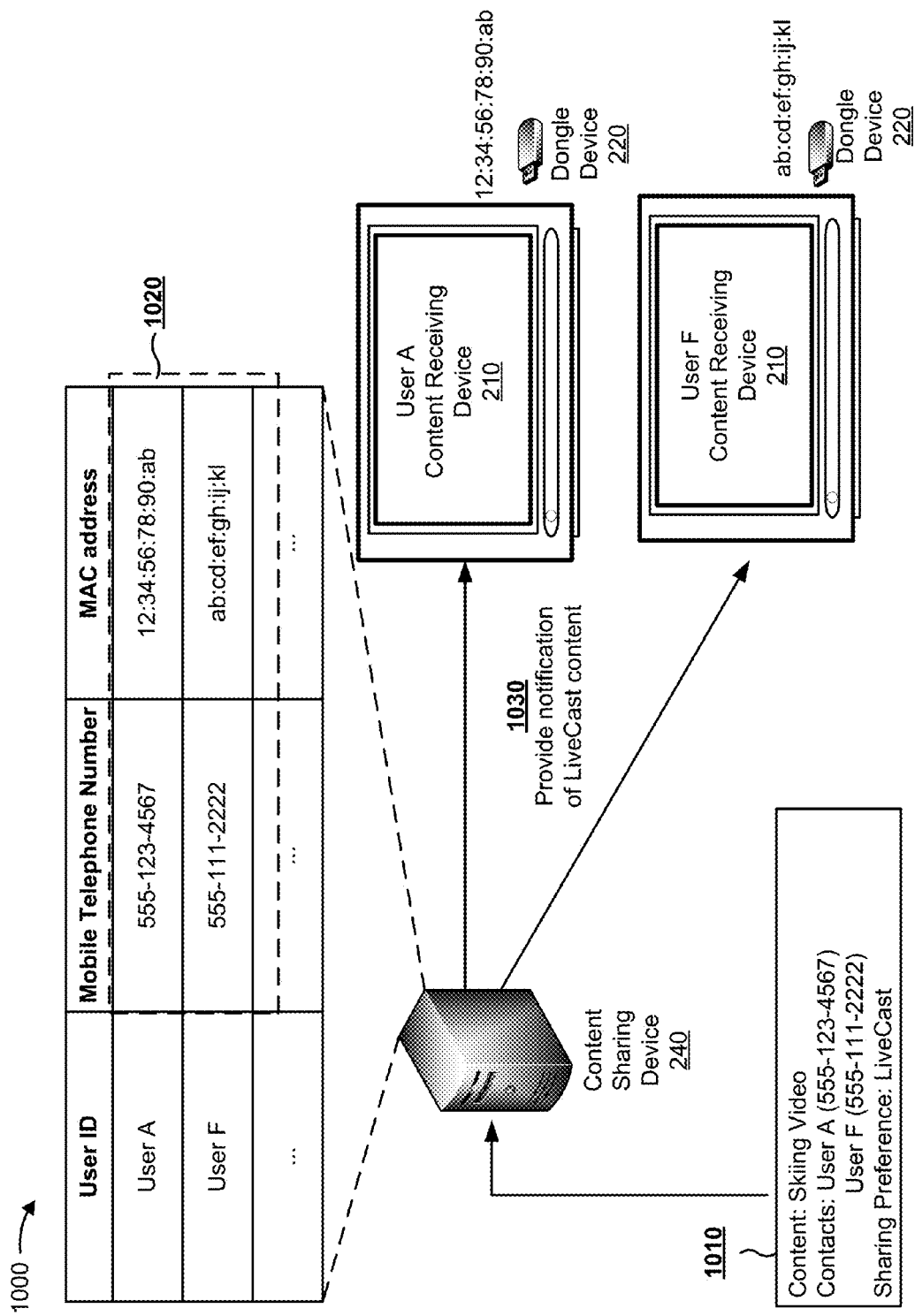
FIGS. 10A-10C are diagrams of another example implementation relating to the example process shown in FIG. 8.
Figure 10B:
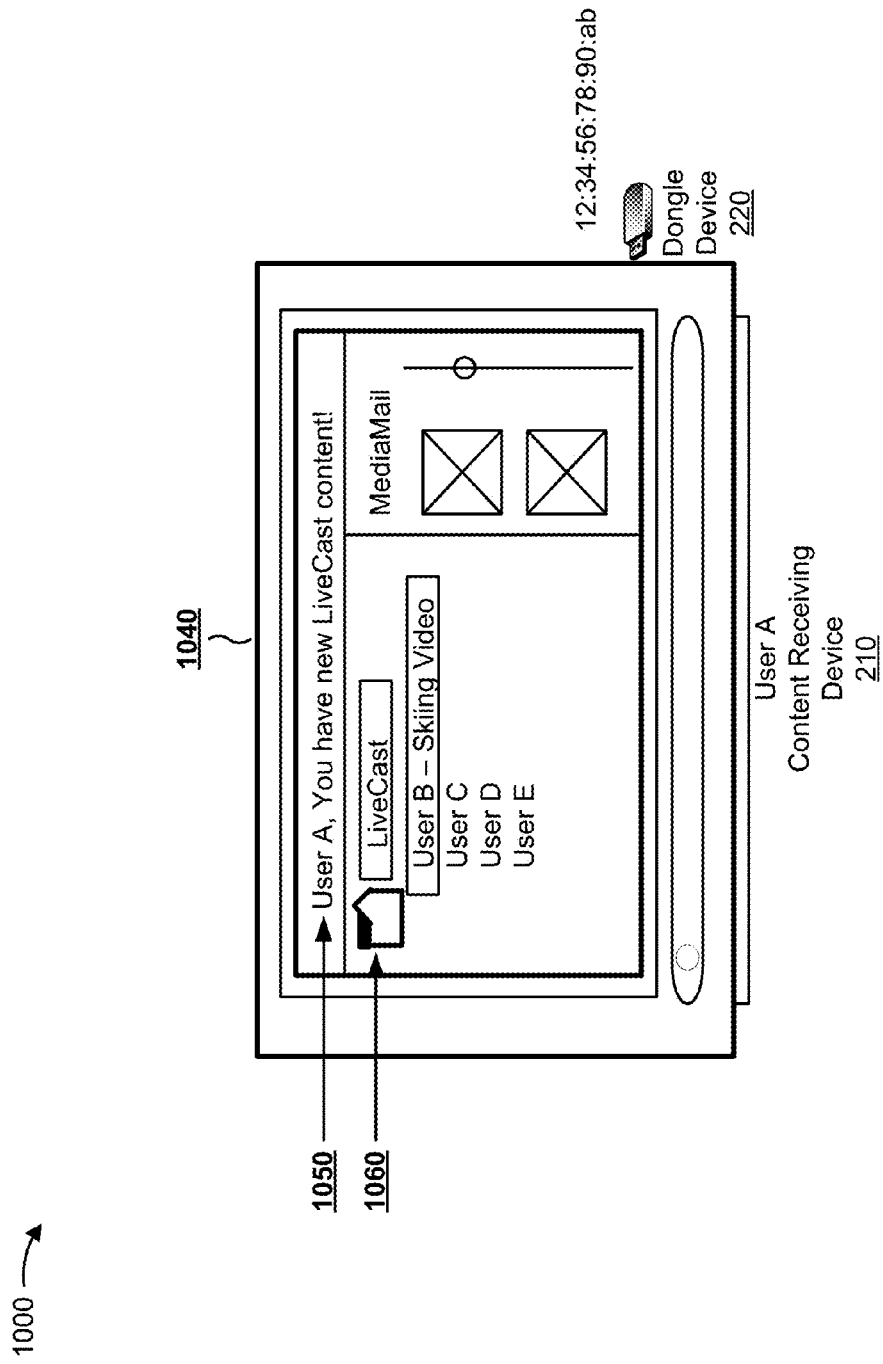
Figure 10C:
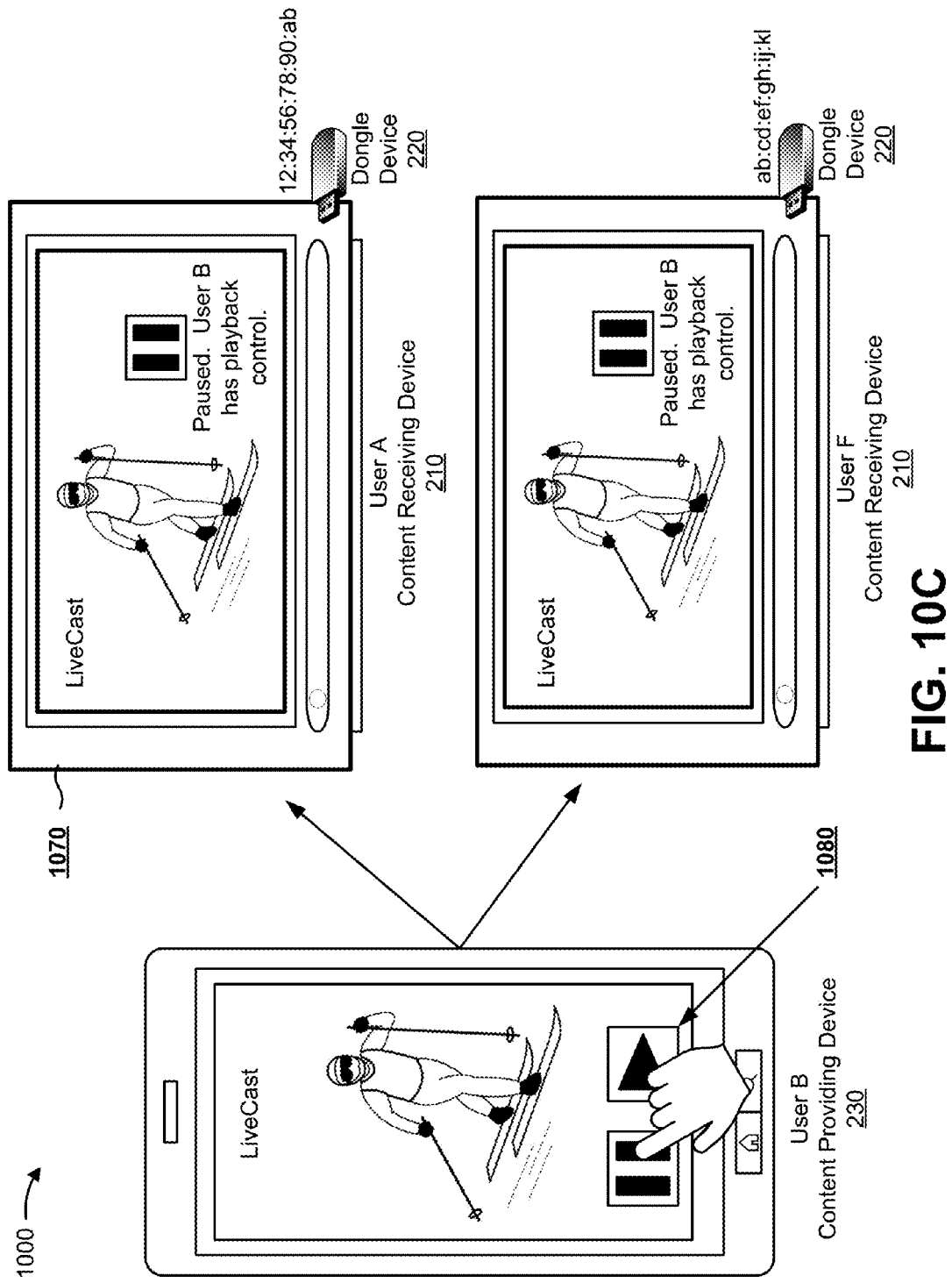

FIGS. 10A-10C are diagrams of another example implementation 1000 relating to example process 800 shown in FIG. 8. FIGS. 10A-10C show another example of sharing content with a dongle device using a content sharing service.

As shown in FIG. 10A, and by reference number 1010, assume that content sharing device 240 receives, from content providing device 230, content sharing information that identifies content to be shared (e.g., "Skiing Video") with two users, identified as User A and User F. Further, assume that the content sharing information indicates that the content is to be shared using a LiveCast service. Further, assume that the content sharing information identifies an MTN associated with User A (e.g., 555-123-4567) and an MTN associated with User F (e.g., 555-111-2222).

As shown by reference number 1020, assume that content sharing device 240 uses the MTNs to determine a MAC address that identifies dongle device 220 associated with User A (e.g., 12:34:56:78:90:ab) and a MAC address that identifies dongle device 220 associated with User F (e.g., ab:cd:ef:gh:ij:kl). As shown by reference number 1030, assume that content sharing device 240 uses these MAC addresses to provide a notification of the LiveCast content to dongle devices 220 associated with these MAC addresses. As shown, assume that dongle device 220 associated with User A is in communication with User A's content receiving device 210 (e.g., User A's television) and that dongle device 220 associated with User F is in communication with User F's content receiving device 210 (e.g., User F's television).

As shown in FIG. 10B, and by reference number 1040, assume that User A accesses a menu associated with the content sharing service. Based on receiving the notification from content sharing device 240, assume that dongle device 220 provides, for display on content receiving device 210, a notification that shared content is available, as shown by reference number 1050 (e.g., "User A, You have new LiveCast content!"). As shown by reference number 1060, assume that User A navigates through the menu to access the LiveCast content, and selects the skiing video shared by User B. Further, assume that User F performs a similar operation (not shown).

As shown in FIG. 10C, and by reference number 1070, assume that User A's interaction with the menu causes dongle device 220 associated with User A (e.g., with a MAC address of 12:34:56:78:90:ab) to provide, for display via content receiving device 210, the Skiing Video shared by User B. Similarly, assume that User F's interaction with the menu causes dongle device 220 associated with User F (e.g., with a MAC address of ab:cd:ef:gh:ij:kl) to provide, for display via content receiving device 210, the Skiing Video shared by User B. As shown by reference number 1080, assume that when sharing content using LiveCast, User B controls playback of the video. In this way, dongle device 220 may assist in easily sharing content between different devices.

As indicated above, FIGS. 10A-10C are provided merely as an example. Other examples are possible and may differ from what was described with regard to FIGS. 10A-10C.

Implementations described herein assist in sharing content between a content providing device and a content receiving device, such as a television, using a dongle device in communication with the content receiving device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A content sharing device, comprising:
one or more processors, implemented at least partially in hardware, to:
receive, from a content providing device associated with a first user, information that identifies content to be shared with a second user via a dongle device;
receive, from the content providing device, an account identifier associated with the second user with which the content is to be shared;
determine, based on determining a media access control address that identifies the dongle device on a network, a dongle device identifier associated with the account identifier, the dongle device identifier including a network address associated with the dongle device;
provide, to the dongle device and based on determining the dongle device identifier and using information identified by the media access control address, information that identifies the content;
the information that identifies the content causing the content to be provided for display via a content receiving device in communication with the dongle device and associated with the second user;
receive a sharing preference from the content providing device; and
provide instructions to the dongle device, based on the sharing preference, to prevent the content from being controlled via input provided to the content receiving device;
the instructions permitting the dongle device to provide the content to the content receiving device and permitting control of playing of the content via the content providing device.

2. The content sharing device of claim 1, where the one or more processors, when providing the information that identifies the content, are to:
provide the content to the dongle device.

3. The content sharing device of claim 1, where the one or more processors, when providing the information that identifies the content, are to:
provide information that identifies a location from which the content can be accessed by the dongle device.

4. The content sharing device of claim 1, where the one or more processors, when receiving the account identifier, are to:
receive information that identifies a telephone number associated with the second user; and
where the one or more processors, when determining the dongle device identifier, are further to:
determine the dongle device identifier using the telephone number.

5. The content sharing device of claim 1, where the one or more processors are further to:
receive another sharing preference from the content providing device;
provide instructions to the dongle device, based on the other sharing preference, to permit the content to be controlled via input provided to the content receiving device, the instructions permitting the dongle device to provide the content to the content receiving device and permitting control of playing of the content via the content receiving device.

6. A non-transitory computer-readable medium storing instructions, the instructions comprising:
one or more instructions that, when executed by one or more processors, cause the one or more processors to:
receive, from a content providing device, information that identifies content to be shared with a dongle device via a content sharing service;
receive, from the content providing device, information that identifies a contact with which the content is to be shared;
determine, based on the information that identifies the contact and based on determining a media access control address that identifies the dongle device on a network, a dongle device identifier, the dongle device identifier including a network address associated with the dongle device;
provide, to the dongle device and based on determining the dongle device identifier and using information identified by the media access control address, information that identifies the content, the information that identifies the content causing the content to be accessible by a content receiving device connected to the dongle device;
receive a sharing preference from the content providing device; and
provide instructions to the dongle device, based on the sharing preference, to prevent the content from being controlled via input provided to the content receiving device;
the instructions permitting the dongle device to provide the content to the content receiving device and permitting control of playing of the content via the content providing device.

7. The non-transitory computer-readable medium of claim 6, where the one or more instructions, that cause the one or more processors to receive the information that identifies the contact, cause the one or more processors to:
receive information that identifies a telephone number associated with the contact; and
where the one or more instructions, that cause the one or more processors to determine the dongle device identifier, cause the one or more processors to:
determine the dongle device identifier based on the telephone number.

8. The non-transitory computer-readable medium of claim 6, where the one or more instructions, when executed by the one or more processors, further cause the one or more processors to:
receive another sharing preference from the content providing device;
provide instructions to the dongle device, based on the other sharing preference, to prevent the content from being controlled via input provided to the content receiving device, the instructions permitting the dongle device to provide the content to the content receiving device and permitting control of playing of the content via the content providing device.

9. The non-transitory computer-readable medium of claim 6, where the one or more instructions, when executed by the one or more processors, further cause the one or more processors to:
receive, from the content providing device, information that identifies a plurality of contacts;

determine a set of contacts, of the plurality of contacts, that are registered for the content sharing service;
provide, to the content providing device, information that identifies the set of contacts; and
where the one or more instructions, that cause the one or more processors to receive the information that identifies the contact with which the content is to be shared, cause the one or more processors to:
receive the information that identifies the contact with which the content is to be shared based on providing the information that identifies the set of contacts, the contact being included in the set of contacts.

10. The non-transitory computer-readable medium of claim 6, where the one or more instructions, that cause the one or more processors to provide the information that identifies the content, cause the one or more processors to:
provide a notification that the content is available for access by the dongle device;
receive, from the dongle device and based on providing the notification, a request for the content; and
provide the content to the dongle device based on receiving the request.

11. The non-transitory computer-readable medium of claim 6, where the one or more instructions, that cause the one or more processors to provide the information that identifies the content, cause the one or more processors to: provide the content to the dongle device.

12. The non-transitory computer-readable medium of claim 6, where the one or more instructions, that cause the one or more processors to provide the information that identifies the content, cause the one or more processors to: provide information that identifies a location from which the content can be accessed by the dongle device.

13. A method, comprising:
receiving, by a content sharing device and from a content providing device, information that identifies content to be shared with a dongle device via a content sharing service;
receiving, by the content sharing device and from the content providing device, a contact identifier that identifies a contact with which the content is to be shared;
determining, by the content sharing device and based on determining a media access control address that identifies the dongle device on a network, a dongle device identifier associated with the contact identifier, the dongle device identifier including a network address associated with the dongle device;
providing, by the content sharing device and to the content providing device, the dongle device identifier, the dongle device identifier permitting the content providing device to provide the content, using information identified by the media access control address, to the dongle device;
receiving, by the content sharing device, a sharing preference from the content providing device; and
providing, by the content sharing device, instructions to the dongle device, based on the sharing preference, to prevent the content from being controlled via input provided to the content receiving device;
the instructions permitting the dongle device to provide the content to the content receiving device and permitting control of playing of the content via the content providing device.

14. The method of claim 13, where the content includes locally-stored content stored locally by the content providing device; and
where the dongle device identifier permits the content providing device to provide the locally-stored content to the dongle device for display via a content receiving device in communication with the dongle device.

15. The method of claim 13, further comprising:
receiving, from the content providing device, information that identifies a plurality of contacts;
determining a set of contacts, of the plurality of contacts, that are registered for the content sharing service;
providing, to the content providing device, a set of contact identifiers corresponding to the set of contacts; and
where receiving the contact identifier comprises:
receiving the contact identifier based on providing the set of contact identifiers,
the contact identifier being included in the set of contact identifiers.

16. The method of claim 13, where receiving the contact identifier comprises:
receiving information that identifies a telephone number associated with the contact; and
where determining the dongle device identifier comprises:
determine the dongle device identifier based on the telephone number.

17. The method of claim 13, further comprising:
providing, to the dongle device, information that identifies a device identifier associated with the content providing device,
the device identifier permitting the dongle device to request access to the content from the content providing device.

18. The method of claim 13, further comprising: providing, to the dongle device, information that identifies the content.

19. The method of claim 18, where providing the information that identifies the content includes: providing the content to the dongle device.

20. The method of claim 18, where providing the information that identifies the content includes: providing information that identifies a location from which the content can be accessed by the dongle device.

* * * * *